(12) United States Patent
Formenti et al.

(10) Patent No.: US 7,755,330 B2
(45) Date of Patent: Jul. 13, 2010

(54) METHODS AND SYSTEMS FOR CONTROLLING AN AC ADAPTER AND BATTERY CHARGER IN A CLOSED LOOP CONFIGURATION

(75) Inventors: Jose Antonio Vieira Formenti, Allen, TX (US); Robert Martinez, Lucas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 136 days.

(21) Appl. No.: 10/983,284

(22) Filed: Nov. 5, 2004

(65) Prior Publication Data

US 2005/0225304 A1 Oct. 13, 2005

Related U.S. Application Data

(60) Provisional application No. 60/558,769, filed on Mar. 31, 2004.

(51) Int. Cl.
H02J 7/06 (2006.01)
G05F 1/00 (2006.01)
(52) U.S. Cl. .................. 320/164; 323/282; 323/283; 323/284; 323/285
(58) Field of Classification Search ............... 320/148, 320/164, 159; 323/211, 267, 282–285; 307/31–33
See application file for complete search history.

(56) References Cited

U.S. PATENT DOCUMENTS

| 4,433,277 | A | * | 2/1984 | Carollo et al. | 320/149 |
| 5,465,039 | A | * | 11/1995 | Narita et al. | 320/164 |
| 5,523,667 | A | * | 6/1996 | Feldstein | 320/118 |
| 5,659,238 | A | | 8/1997 | Faulk et al. | |
| 5,677,077 | A | | 10/1997 | Faulk | |
| 5,684,382 | A | * | 11/1997 | Fritz et al. | 320/164 |
| 5,847,543 | A | * | 12/1998 | Carroll | 320/125 |
| 5,945,807 | A | * | 8/1999 | Faulk | 320/128 |
| 2004/0075418 | A1 | * | 4/2004 | Densham et al. | 320/111 |

* cited by examiner

*Primary Examiner*—Edward Tso
*Assistant Examiner*—Richard V Muralidar
(74) *Attorney, Agent, or Firm*—John J. Patti; Wade J. Brady, III; Frederick J. Telecky, Jr.

(57) ABSTRACT

Disclosed are methods, circuits, and systems for implementing an AC voltage adapter and battery charger system in a closed loop topology. Embodiments of the invention include methods for controlling an AC adapter charging a battery with steps for using a closed loop configuration to monitor one or more selected parameters in the charging loop. Feedback to the AC adapter is used for dynamically controlling the adapter output voltage. A preferred embodiment exemplifies a closed loop circuit for battery charging. The circuit includes an AC adapter and a monitoring circuit for monitoring the closed loop and for providing feedback to the AC adapter, controlling the adapter output voltage.

20 Claims, 1 Drawing Sheet

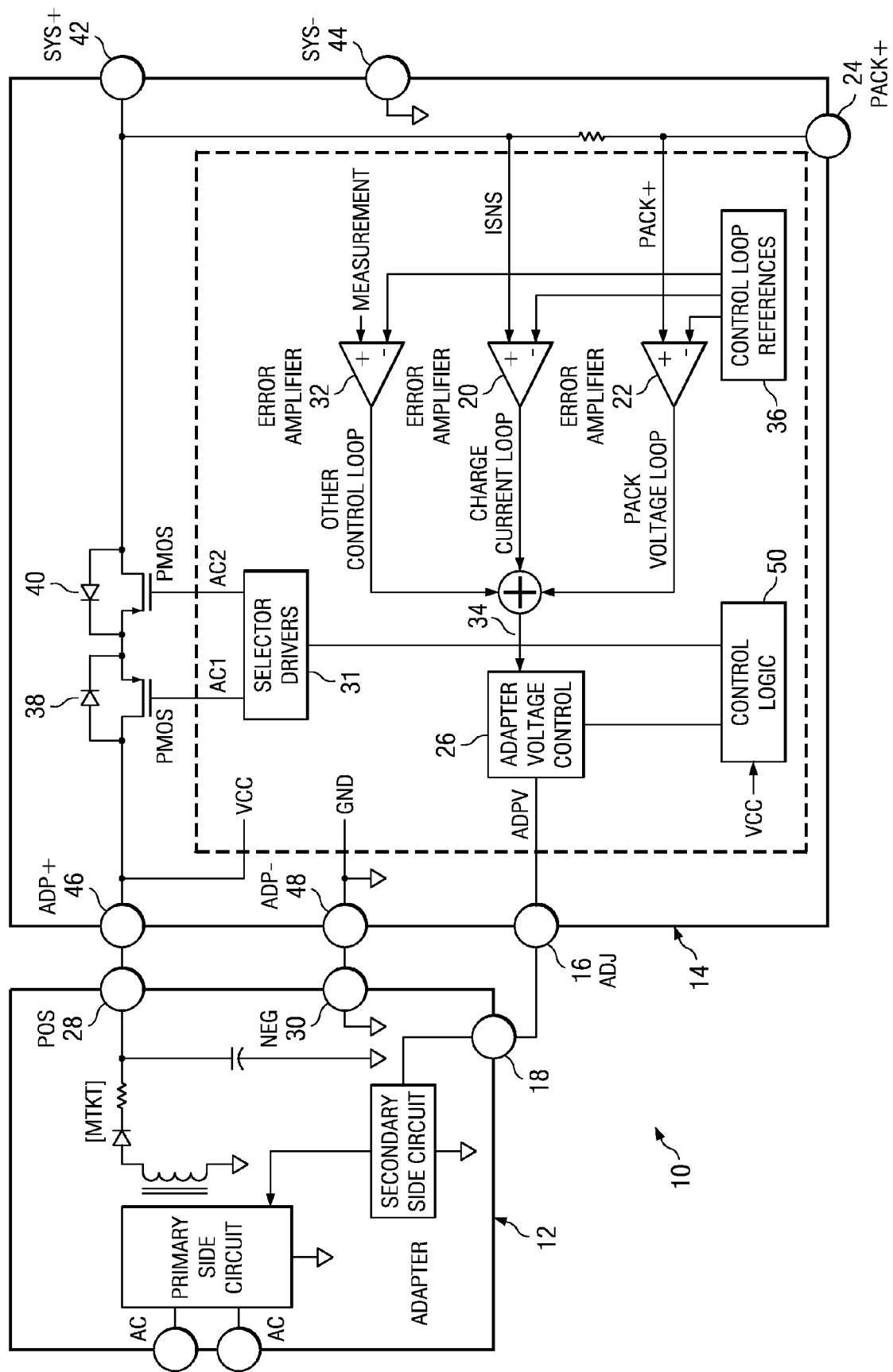

METHODS AND SYSTEMS FOR CONTROLLING AN AC ADAPTER AND BATTERY CHARGER IN A CLOSED LOOP CONFIGURATION

RELATED APPLICATION

This application claims priority based on Provisional Patent Application 60/558,769, which has been given a filing date of Mar. 31, 2004. This application and the aforementioned Provisional Patent Application have at least one common inventor and are assigned to the same entity.

TECHNICAL FIELD

The invention relates in general to electronic circuitry. More particularly, it relates to methods and systems for dynamically controlling an AC adapter and DC battery charger.

BACKGROUND OF THE INVENTION

Many portable electronic devices known in the arts, such as portable computers, use chargers to replenish batteries when access to AC power is available. A common approach requires the use of an AC adapter, which converts the AC power to a fixed output DC voltage, and a charger function that is implemented in the end equipment. Generally, the approach commonly used in the arts requires a system where the charger function has multiple control loops and a power conversion stage. The power stage down-converts the fixed AC adapter output DC voltage by means of either a linear stage or a switching mode converter. The multiple control loops and the charger stage implement the battery charger function that executes the battery charging process.

The charger function control loops monitor specific battery and system parameters such as (but not limited to) battery voltage and/or battery current, compares each of them to a reference value, and generates an error signal as needed, that is sent to the charger power stage. This error signal, in turn, adjusts the power stage duty cycle (in DC/DC conversion power stages) or the power stage pass element conductance (in linear power stages) in order to set the battery charge current or battery charge voltage to the desired value. The control loops and the power stage are set in a loop configuration, and the power stage duty cycle (DC/DC) or conductance (linear) is set in order to minimize the error signal generated by the control loops, thus achieving the desired battery charge current and battery charge voltage regulation. Control loops that monitor distinct pack or system parameters other than the battery charge current or battery charge voltage may be added to the system, depending on the overall system requirements. However, any control loop added always affects the control signal that is used to set the power stage duty cycle (DC/DC) or pass element conductance (linear). The charge current and charge voltage references are sent to the control loops by, either a keyboard controller (KBC), or by a dedicated power management controller or circuit, as they are dependent upon the configuration of the battery pack.

The approach for the interface between the multiple control loops and power stage generally known in the arts requires the inclusion of both the control loop circuitry and the power stage in the end equipment, with the AC adapter output voltage being of a fixed value. As a result, in this approach the AC adapter output voltage is not dependent on the error signal generated by the control loops. This approach results in many disadvantages in commonly used battery charger control topologies, including but not limited to the high cost of power stage elements such as inductors, filter capacitors and MOSFET switches in DC/DC power stage topologies, and linear pass elements (usually MOSFET switches) in linear power stage topologies. System efficiency suffers as a result of the conduction and/or switching losses in the power stage. Power dissipation in the end equipment is increased by converter stage power dissipation.

Due to these and other problems, improved systems and methods for controlling an AC adapter for charging batteries in portable electronic systems would be useful and advantageous in the arts.

SUMMARY OF THE INVENTION

In carrying out the principles of the present invention, in accordance with preferred embodiments thereof, methods and systems are provided for implementing a topology that uses the AC adapter as the charger power stage, while maintaining the multiple control loops in the end equipment. The AC adapter voltage is set based on an error signal sent from the multiple control loops, located in the end equipment, to the charger power stage, located in the AC adapter.

According to one aspect of the invention, methods for controlling an AC adapter for charging a battery include steps for connecting the charger power stage, located in the AC adapter, to multiple control loops located in the end equipment using a closed loop configuration. This closed loop configuration enables the multiple control loops in the end equipment to send a feedback control signal to the AC adapter, thus implementing a method that dynamically controls the adapter output voltage within the loop.

According to another aspect of the invention, a preferred embodiment exemplifies a closed loop circuit for battery charging. The circuit includes an AC adapter coupled with a monitoring circuit for monitoring selected parameters in the closed loop and for providing feedback to the adapter for dynamically controlling the adapter output voltage.

According to another aspect of the invention, a system of the invention includes an AC adapter coupled with a battery in a closed loop. Means for monitoring selected parameters in the loop, and means for providing feedback to the adapter for dynamically controlling the adapter output voltage, are provided.

The invention provides advantages including but not limited to reduced power dissipation, reduced end equipment component count, increased cross-platform utility, and reduced costs. These and other features, advantages, and benefits of the present invention can be understood by one of ordinary skill in the arts upon careful consideration of the detailed description of representative embodiments of the invention in connection with the accompanying drawings.

BRIEF DESCRIPTION OF THE DRAWING

The present invention will be more clearly understood from consideration of the following detailed description and drawing in which:

The FIGURE is a simplified schematic circuit diagram showing an example of a preferred embodiment of the invention.

References in the detailed description correspond to like references in the Figure unless otherwise noted. Descriptive and directional terms used in the written description such as first, second, top, bottom, upper, side, etc., refer to the drawing as laid out on the paper and not to physical limitations of the invention unless specifically noted. The drawing is not to scale, and some features of embodiments shown and discussed are simplified or amplified for illustrating the principles, features, and advantages of the invention.

DETAILED DESCRIPTION OF PREFERRED EMBODIMENTS

In general, the invention provides methods and systems for configuring an AC voltage adapter and end equipment control loops in a closed loop topology to implement a battery charging system. According to the invention, the charger power stage is implemented in the AC adapter, while the other control loops are preferably implemented in the end equipment.

Referring to the Figure, a circuit 10 illustrating a preferred embodiment of the invention is shown by way of example. It should be understood that there are various alternative implementations that may be made without departure from the principles of the invention. By examination of the circuit 10, it may be seen that the AC adapter 12 is controlled from the system side 14 in a closed loop configuration, by a control signal sent from the system 14 to the adapter 12 at nodes 16 and 18 respectively. The charge current control loop 20 and the charge voltage control loop 22 are configured to monitor the charging of the battery pack 24 in order to permit the adapter voltage control 26 to reduce the adapter voltage (POS 28, NEG 30) when selected charge current and charge voltage levels are reached. In addition to control loops 20 and 22, other control loops 32 for monitoring system or battery parameters other than the battery charge voltage or battery charge current may be added to the system 14. The distinct error signals from the control loops, 20, 22, 32, are preferably added, as shown at node 34, and converted to a control signal for output at node 16 by the adapter voltage control 26. The control signal at node 16 sent to the adapter 12 (at node 18) may be in the form of an analog current or analog voltage. Alternatively, the error signal at node 16 may be converted to a digital signal at adapter voltage control 26 and output in digital form at output 16 to control the AC adapter voltage 28, 30. The adapter voltage 28, 30 is preferably controlled by a dedicated input 18 in the adapter 12. Preferably, the maximum charge current, acceptable charge voltage level limits, and other references required by the multiple control loops implemented in the system 14 may be preprogrammed in the control loop references 36 according to application requirements. The adapter voltage 28 is preferably set higher than the battery pack 24 voltage by the amount required to achieve regulation, overcoming any voltage drops present in the path from the adapter 12 to the battery pack 24.

Preferably, MOSFET switches 38, 40, are added to isolate the adapter output voltage at node 28 from the system power bus 42. In normal operation, the MOSFET 38, 40 switches are turned on, and will add an ohmic impedance between AC adapter power node 28 and system bus power 42. Under fault conditions the control logic 50 turns off the MOSFET switches 38, 40, to avoid damage to the end equipment. It should be appreciated that since the AC adapter voltage 28 is maintained above the pack voltage 24 by an amount defined by ohmic impedances, there are no detrimental current peaks when switching from adapter power to battery pack power, and vice versa. In addition, the closed loop configuration ensures that the AC adapter output voltage 28 will be set to the lowest value required to supply the system load at node 42 and the battery charge current at node 24, thus decreasing the power dissipation in the system 14.

Practitioners skilled in the arts will appreciate that the description and drawing portrays but one example of an implementation of the invention. The embodiments shown and described provide a relatively high-level view of an example of the implementation of the principles of the invention for which many alternative circuits may be derived by those skilled in the arts. Various parameters may be monitored according to the specific application of the invention so long as they are used to detect required changes in the AC adapter load, for example, input voltage, charge current, or charge voltage, may be used. In this way, ongoing dynamic changes to the adapter voltage are made in order to operate the charger in a closed loop topology.

The methods and systems of the invention provide advantages including but not limited to reduced power dissipation, reduced component count, increased cross-platform utility, and reduced costs. While the invention has been described with reference to certain illustrative embodiments, the methods and circuitry described are not intended to be construed in a limiting sense. Various modifications, alternative implementations, and combinations of the illustrative embodiments as well as other advantages and embodiments of the invention will be apparent to persons skilled in the art upon reference to the description and claims.

We claim:

1. A method for charging a battery comprising:
coupling an end equipment system to an AC adapter that provides an AC adapter output voltage to charge the battery of the end equipment system;
monitoring, at the end equipment system, a plurality of parameters associated with the charging of the battery;
determining a plurality of error signals from a plurality of error amplifiers by comparing the monitored plurality of parameters to a plurality of preprogrammed references;
adding the plurality of error signals to provide a total error signal;
converting the total error signal to a control signal;
sending the control signal to the AC adapter;
determining whether to actuate or deactuate a plurality of switches based at least in part on the control signal; and
adjusting the AC adapter output voltage in response to the control signal.

2. The method according to claim 1, wherein the plurality of parameters further comprise battery charge current and battery charge voltage.

3. The method according to claim 1, wherein the plurality of parameters further comprise at least two of system parameters, battery parameters, and input voltage.

4. The method according to claim 1, wherein the AC adapter output voltage is set higher than the voltage of the battery by an amount required to achieve regulation to overcome voltage drops in the path from the AC adapter to the battery.

5. The method according to claim 4, wherein the amount is defined by an ohmic impedance in the path.

6. The method according to claim 5, wherein the ohmic impedance in the path is based on the ohmic impedance of fault condition switches located in the path.

7. The method according to claim 5, wherein the AC adapter output voltage is set to a lowest value required to supply a system load of the end equipment and a battery charge current to the battery.

8. A system for charging a battery comprising:
an AC adapter that provides an AC adapter output voltage to charge the battery; and
an end equipment system coupled to the AC adapter, the end equipment system including:
the battery;
a plurality of control loops, wherein each control loop includes an error amplifier that generates an error signal by comparing at least one of a plurality of parameters associated with the charging of the battery to at least one of a plurality of preprogrammed references;

an adder that adds each of the error signals together to provide a total error signal;

an adapter voltage control that converts the total error signal to a control signal, wherein the AC adapter is configured to adjust the AC adapter output voltage in response to the control signal;

control logic that is coupled to the adapter voltage control; and a driver that is coupled to the control logic, wherein the driver is adapted to provide actuation signals.

9. The system according to claim 8, wherein each of the plurality of control loops further comprises an error amplifier that determines an error signal based on one parameter of the plurality of parameters and one preprogrammed reference of the plurality of preprogrammed references.

10. The system according to claim 8, wherein the plurality of parameters further comprise battery charge current and battery charge voltage.

11. The system according to claim 8, wherein the plurality of parameters further comprise at least two of system parameters, battery parameters, and input voltage.

12. The system according to claim 8, wherein the AC adapter is configured to set the AC adapter output voltage higher than the voltage of the battery by an amount required to achieve regulation to overcome voltage drops in the path from the AC adapter to the battery.

13. The system according to claim 12, wherein the amount is defined by an ohmic impedance in the path.

14. The system according to claim 8, wherein the system further comprises fault condition switches located in the path between an AC adapter output voltage terminal and a system power bus of the end equipment, the fault condition switches being turned on in a normal operation and turning off under a fault condition to avoid damage to the end equipment system.

15. The system according to claim 14, wherein the system power bus is coupled to the battery.

16. The system according to claim 8, wherein the AC adapter output voltage is set to a lowest value required to supply a system load of the end equipment and a battery charge current to the battery.

17. A system for charging a battery comprising:

an AC adapter that provides an AC adapter output voltage to charge a battery of an end equipment system, the AC adapter being configured to adjust the AC adapter output voltage in response to a control signal; and an end equipment system coupled to the AC adapter, the end equipment system including:

a battery;

a plurality of error amplifiers configured to determine a respective error signal by comparing a parameter associated with the charging of the battery to a respective preprogrammed reference;

an adder that adds the error signals of the plurality of error amplifiers to provide a total error signal;

an adapter voltage control that converts the total error signal to the control signal that is employed to adjust the AC adapter output voltage;

control logic that is coupled to the adapter voltage control; and a driver that is coupled to the control logic, wherein the driver is adapted to provide actuation signals.

18. The system according to claim 17, wherein the plurality of error amplifiers further comprises a first error amplifier that determines an error signal based on a battery charge current and a maximum charge current limit of the battery and a second error amplifier that determines an error signal based on a battery charge voltage and an acceptable charge voltage level limit.

19. The system according to claim 18, wherein the plurality of error amplifiers further comprises a third error amplifier that determines an error signal based on one of another battery charge parameter and a system parameter of the end equipment system.

20. The system according to claim 17, wherein the control signal is one of an analog current, an analog voltage, and a digital signal.

* * * * *